Dec. 13, 1955   H. C. FITZSIMMONS   2,726,808
CENTRIFUGAL SEPARATION
Filed April 23, 1951   3 Sheets-Sheet 1

INVENTOR.
HAROLD C. FITZSIMMONS
BY Hugo G. Kemman
ATTORNEY

Dec. 13, 1955 H. C. FITZSIMMONS 2,726,808
CENTRIFUGAL SEPARATION
Filed April 23, 1951 3 Sheets-Sheet 2

INVENTOR.
HAROLD C. FITZSIMMONS
BY Hugo G. Kemman
ATTORNEY

Dec. 13, 1955  H. C. FITZSIMMONS  2,726,808
CENTRIFUGAL SEPARATION
Filed April 23, 1951  3 Sheets-Sheet 3

INVENTOR.
HAROLD C. FITZSIMMONS
BY Hugo G. Kemman
ATTORNEY

United States Patent Office 2,726,808
Patented Dec. 13, 1955

2,726,808
CENTRIFUGAL SEPARATION

Harold C. Fitzsimmons, West Chester, Pa., assignor to The Sharples Corporation, a corporation of Delaware Application April 23, 1951, Serial No. 222,483

7 Claims. (Cl. 233—19)

The present invention relates to a method of separating a plurality of liquids into their constituents and to apparatus for carrying out such method. More particularly, this invention relates to a method and means of controlling the amount of one of the separated liquid components that is admixed with another liquid component.

In the manufacture of condensed or evaporated milk, a portion of the aqueous phase is removed by evaporation. For a uniform product, the condensed or evaporated milk must have a fixed ratio between butterfat and solids-not-fat (e. g. 7.9% fat and 25.9% total solids). To accomplish this, it is necessary to standardize the whole milk before it is introduced into the vacuum pan. By standardization is meant a regulation of the butterfat content in the whole milk so that each batch that is processed will have the proper relation of butterfat to total solids after concentration. The reason that such standardization is essential is that incoming whole milk may vary from less than 2% butterfat content to over 8% butterfat content depending on the breed of cow from which the milk is obtained, on the season of the year, on the kind of feed, on the length of time between milkings, and on individual variations between cows due to various causes. The solids-not-fat, however, do not vary through nearly such a wide range, thus throwing the relation of fat to total solids out of balance.

Although, as stated above, some milk may be as low as 2% in butterfat content, the average receipts of whole milk, in general, contain more than 3% butterfat. For the making of condensed or evaporated milk, of the required ratio of fat to total solids, it is necessary to standardize the whole milk to a butterfat content of around 2.9 to 3%. Since the average receipts of milk are in excess of this butterfat content, the method of standardization heretofore used has been to process a portion of the whole milk through a cream separator, discharging on the one part concentrated cream, and on the other part skim milk, having very little butterfat content. A portion of this skim milk is then stirred into the balance of the whole milk, to bring the butterfat content down to the desired percentage. This method is inconvenient, from an operating standpoint, since it is a discontinuous process, requiring that a batch of whole milk be held while a portion of it is being run through the cream separator, and sometimes requiring tedious adjustment back and forth between adding skim milk and adding concentrated cream until the butterfat test of the batch of milk is correct.

Standardization is also required in the cheese-making industry. There are something like 500 varieties of cheese, differing largely in butterfat content, acidity of the milk, temperature at which the production is carried out, and amount of rennet used. To control the composition of the final product, it is important to control the amount of butterfat that goes into the cheese making. All of the steps of the cheese-making process are simplified by starting with a known and unchanging butterfat percentage. As an illustration, in the manufacture of Swiss cheese, in order to provide the desired relationship between butterfat content and solids-not-fat, some fat will usually need to be removed from whole milk regardless of the original butterfat content of the whole milk. For example, if the whole milk contains 4% butterfat, it should be reduced to something in the range of 3.4% butterfat. If the whole milk originally contains 3.5% butterfat, it should be reduced to about 3%, and if the original milk contains 3.2% butterfat it should be reduced to approximately 3%, to have the proper composition, which in the final cheese averages 27% to 30% fat, and approximately 45% total solids. In the past, standardization of the whole milk for cheese-making has been done in the same manner as is described above for the preparation of milk for evaporation or condensation.

Among the objects of this invention is to provide a continuous means of producing a whole milk having a preselected butterfat content. Another object of this invention is to make the percentage of butterfat in the standardized milk easily adjustable without interfering with the continuity of flow to the subsequent processing system. Another object of the invention is to continuously separate from the incoming milk any excess of butterfat over the proportion desired for further processing, and deliver this excess as cream. Other objects and advantages of the invention will become apparent to persons skilled in the art as the specification proceeds, and upon reference to the drawings in which—

Figure 1:
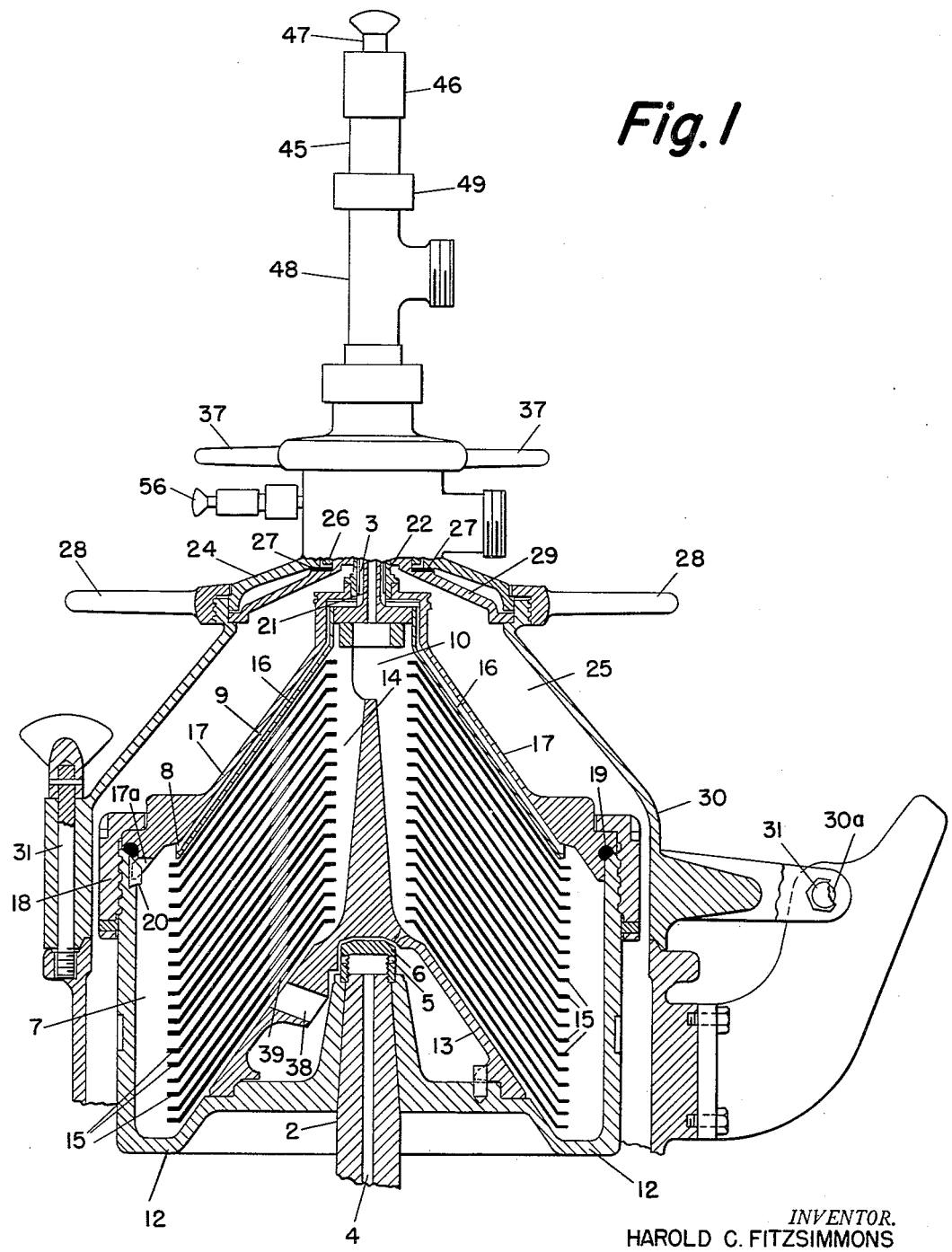
Figure 1 is an elevation partly in section of a centrifugal machine illustrating one embodiment of this invention.
Figure 2:
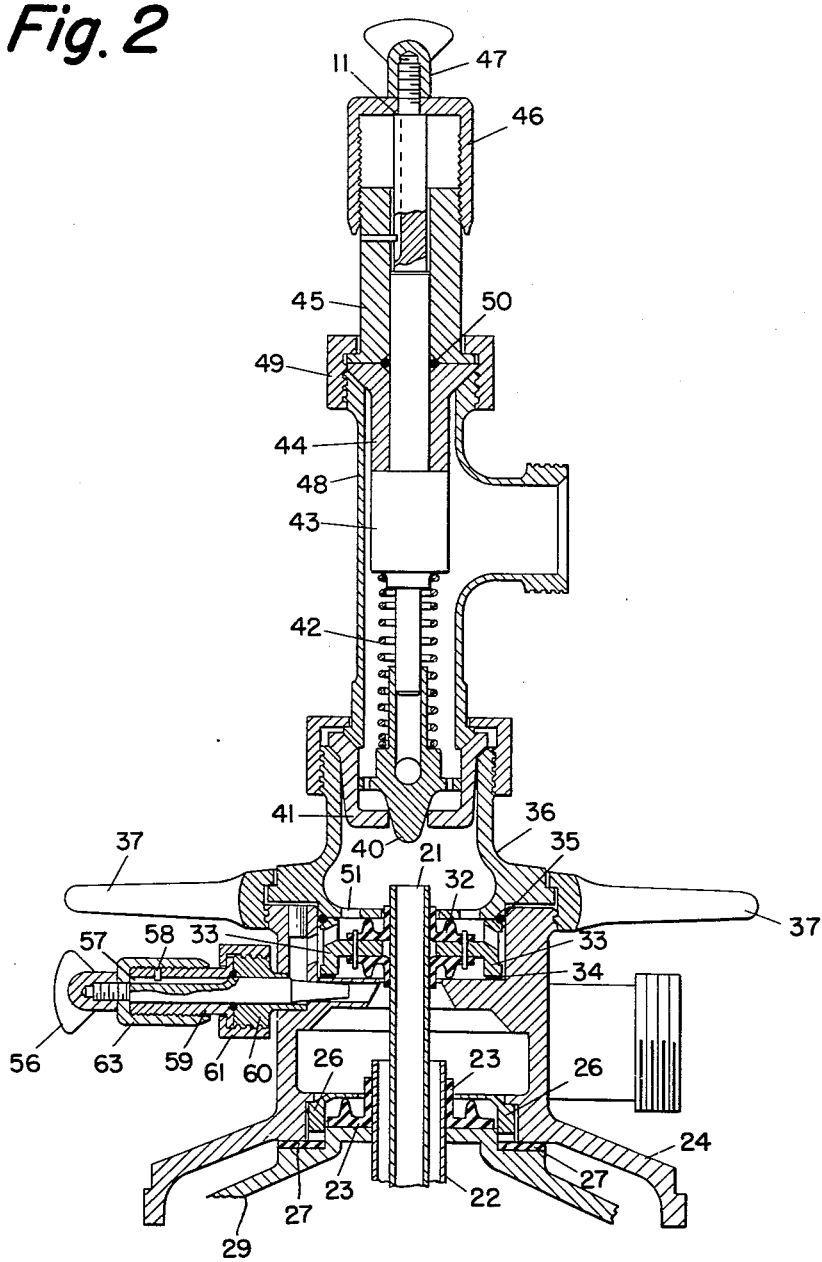
Figure 2 is a sectional elevation of the standardizing valve, the cream regulating valve, and associated parts.

In the drawings a centrifugal machine is shown comprising a rotor body 12 which is driven by a shaft 2 mounted for rotation within a support not shown, and itself driven by any suitable form of motor. Inside the rotor body 12 is a center tube 13 having a plurality of vanes 14 extending upward to serve as a mounting for a series of discs 15. Above the discs is a dividing cone 16 and above the dividing cone is a rotor top 17, held in place against the rotor body 12 by a coupling ring 18 compressing a gasket 19. The rotor top 17 is oriented in relation to the rotor body 12 by having a slot 17a therein which engages a key 20 attached to the rotor body. Attached to the dividing cone 16 is an upward extending sleeve 21. Attached to the rotor top 17 is another upward extending sleeve 22 surrounding sleeve 21 but of shorter length. A plurality of channels 3 are milled in the outside of sleeve 21, communicating with the space in the upper end of the rotor above the dividing cone 16, and the interior of sleeve 21 communicates with the center of the rotor.

Surrounding the sleeve 22 is a seal 23 to prevent liquid discharging through channels 3 into housing 24 from escaping into the chamber 25. This seal is held in position by the plate 26, in conjunction with the housing 24, which is sealed against a gasket 27, under the pressure of the nut 28. Gasket 27 is seated on cover plate 29 which is supported by cover 30, hinged at 30a and which in turn is fastened to the frame by the attachments 31.

Two seals 32 are in close engagement with sleeve 21, being mounted on each side of the spacer 33 which is clamped in position against gaskets 34 and 35 by the tightening of the housing 36 by means of the nut 37. The seals 32 prevent leakage between the housings 24 and 36.

Whole milk to be separated is introduced under pressure into the rotor body 12 through a channel 4 through the shaft 2 and discharges through a plurality of ports 5 in the nut 6 which is attached to the upper end of the shaft, and which fastens the rotor body 12 to the shaft. This milk then passes outwardly under the influence of centrifugal force, and flows through a plurality of channels 38, then upwardly through matching holes 39 in the discs 15. Under the action of centrifugal force, the skim milk, being the heavier component, moves outwardly between the discs into the chamber 7 and then inwardly at 8 above the dividing cone 16, which is spaced from the rotor top 17 by a plurality of vanes 9, then through the channels 3 into the housing 24 from which it is piped away to skim milk storage.

The cream, which is a suspension of butterfat globules in milk, moves inwardly between the discs toward the center, into the channels 10, between the vanes 14, and then upwardly through the sleeve 21 into the housing 36. This cream is delivered from the machine through a relief valve comprising the valve disc 40 and the valve seat 41. The lifting of the valve disc 40 is restrained by the spring 42 which abuts against a shoulder on the valve stem 43. The valve stem 43 has an upward extension that passes through the sleeve 44 and the sleeve 45. The upper portion of sleeve 45 is threaded on the outside to engage a regulating nut 46 which bears on a shoulder 11 of the valve stem 43. The upper end of the valve stem 43 is threaded for a lock nut 47. The sleeves 45 and 44 are mounted in conjunction with the housing 48 by means of the nut 49, which compresses the parts together against a gasket 50. Adjusting the nut 46 and then tightening the lock nut 47, will vary the pressure on the spring 42, which will vary the back pressure on the cream discharging from the rotor into housing 48, from which the cream is piped away to storage. An increase in back pressure will result in a cream of higher concentration, and a decrease in back pressure will result in a cream of lower concentration, so that a regulation of nut 46 makes it possible to discharge cream of whatever concentration is desired.

What has been described above constitutes a well-known form of cream separator of what is known as the "full bowl" type, characterized by the fact that there is no air core in the center of the rotor, but it is completely full of liquid. For convenience in description and in the claims, the paths of flow of the phases after separation may be termed conduits.

Figure 3:
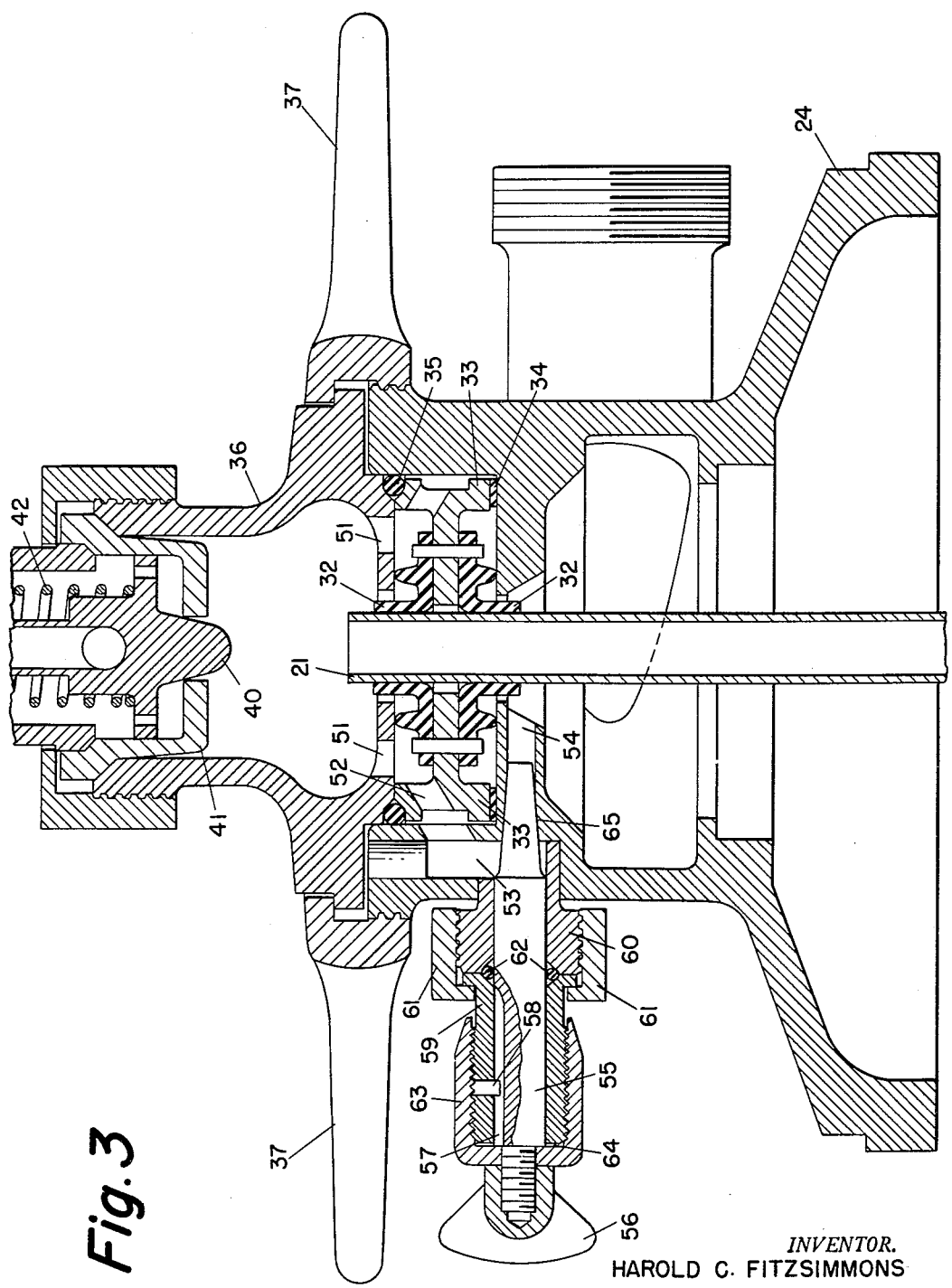
Figure 3 is an enlarged sectional view of the standardizing valve and its associated parts.

A feature of the present invention is the introduction of a valve that permits communication between the cream outlet housing 36 and the skim milk outlet housing 24. The details of the design can be more readily understood by reference to Figure 3. A channel 51 is provided in the lower part of the cream outlet housing 36 which communicates with port 52 through the seal spacer 33, and another port 53 in the upper part of the skim milk housing 24 communicates with a channel 54 that is open to the interior of the skim milk housing 24. A valve stem 55 has a tapered end that matches the circular opening 65 of channel 54, and this circular opening functions as a valve seat. The opposite end of the valve stem 55 is threaded to engage a lock nut 56, and a portion of the valve stem 55 is grooved at 57 to engage a pin 58 which is fastened to the valve head 59. The valve head 59 is held tightly against a threaded portion 60 of the skim milk housing 24 by means of a nut 61. A bevel is provided between the valve head 59 and the threaded extension 60 of the skim milk housing 24, in which is placed a flexible gasket 62 to seal against leakage at this joint. The outside of the valve head 59 is threaded for engagement with an adjusting nut 63 which bears against a shoulder 64 on the valve stem 55.

As previously described, whole milk is fed through channel 4 under pressure, and is separated into skim milk, which discharges into housing 24, and cream which discharges into housing 36. The pressure of the feed of liquid is transmitted through the rotor into the cream outlet housing 36, causing the lifting of the valve disc 40 against the resistance of the spring 42. On the skim-milk side, however, much of the feed pressure is dissipated through the need to force the milk outward between the discs 15 into a zone of higher peripheral speed, and then inwardly above the dividing cone 16 into a zone of lower peripheral speed. There is therefore a greater available head pressure in the cream outlet housing 36 than in the skim milk housing 24. When the centrifuge is in normal operation, the skim milk discharge will be substantially free of butterfat, and the cream discharge will contain, for example, 30% butterfat, or any other desired butterfat content depending on the adjustment of the regulating nut 46. If it is desired that whole milk be available having, for example, 3% butterfat content, then the adjusting nut 63 is screwed outwardly so as to lift the valve stem 55 off its seat 65, and this new position of the valve stem is then locked by means of the nut 56. Because of the higher pressure in the cream outlet housing, a portion of cream will flow through ports 51, 52 and 53, being delivered into the skim milk housing through channel 54. A close regulation of the position of the valve stem 55 will permit the introduction of approximately exactly the correct amount of cream into the skim milk to result in a discharge of milk on the skim-milk side containing the desired 3% butterfat.

With such a provision, any desired butterfat content can be introduced into the skim milk to make a whole milk of the desired concentration, and the percentage of cream delivered into the skim milk can be varied at will by the shifting of the position of the adjusting nut 63. This change in percentage can be made at any time throughout the course of a run, not requiring that the machine be shut down, and permitting a continuous delivery of milk of the desired concentration without the need for storage in vats and subsequent standardization. For example, it may be desirable to have a whole milk having 2.9% butterfat for subsequent reduction into condensed milk, and after a supply of whole milk of this composition has been delivered to the evaporators it may then be desired to have a whole milk of 3.5% butterfat for the manufacture of cheese. The change from one butterfat content to the other can be made without interrupting the flow of whole milk to the centrifuge, and without delay of any kind. The excess of butterfat that exists in the original whole milk beyond what is required for subsequent processing is delivered as cream of whatever concentration is desired, depending on the position of the adjusting nut 46, and this cream is available for sale as cream or for processing into products that require a higher percentage of butterfat.

Although the above example is described as a means of varying the butterfat content of whole milk, the invention is not limited to that application, but is applicable to the separation of any other mixture where it is desired that a fixed amount of the one component be present in another separated component, it being well known that whole milk comprises a dispersion of butterfat in a continuous aqueous phase of milk solubles, that cream comprises a dispersion in considerably higher concentration of butterfat in said aqueous phase, and that skim milk comprises a dispersion in extremely low concentration of butterfat in said aqueous phase.

Furthermore, while the invention has been described in connection with the metering of a regulated amount of lighter phase into the heavier phase, it is to be understood that my invention is also applicable to the metering of a regulated amount of the heavier phase into the lighter phase. To accomplish the latter, it is merely necessary to establish, by any suitable means, higher pressure on the discharge of the heavier phase from the centrifuge than on the discharge of the lighter phase.

From the foregoing it will be seen that to meter a regulated amount of one phase into the other phase as the phases are being discharged from the centrifuge, a differential in back pressure between the two discharging continuous streams of the separated phases is a feature, and that this may be accomplished by any suitable means.

Accordingly my invention is applicable even though back pressure is established on both streams but in differential amounts, or a reduced pressure is established on one of said discharging streams.

Other variations will occur to persons skilled in the art upon becoming familiar herewith. Therefore, it is to be understood that the above particular description is by way of illustration, and that changes, omissions, additions, substitutions, and/or modifications, may be made within the scope of the claims without departing from the spirit of the invention. Accordingly it is intended that the patent shall cover by suitable expression in the claims whatever features of patentable novelty reside in the invention.

I claim:

1. A process for the centrifugal separation of a dispersion in which the dispersed phase is of a different density than the continuous phase into two dispersions each of standardized and different dispersed phase content, comprising subjecting said first-mentioned dispersion to centrifugation under full bowl conditions to cause the separation of said first-mentioned dispersion into a more concentrated dispersion and a less concentrated dispersion, said centrifugation being carried out under conditions such that one of the separated dispersions is discharged from the zone of centrifugation at a higher pressure than the other due to the application of back pressure thereon, maintaining substantially constant said back pressure on the dispersion discharged at higher pressure and while under said back pressure feeding a controlled amount of said last-mentioned dispersion into the other of said separated dispersions.

2. A process for the centrifugal separation of whole milk to produce a milk and a cream both of standardized butterfat content, comprising subjecting whole milk to centrifugal separation in a centrifuge operating under full bowl conditions to produce a continuous stream of skim milk and a continuous stream of cream, said full bowl operating conditions establishing a differentially higher discharge pressure on said continuous stream of cream than on said continuous stream of skim milk due to the application of back pressure on the discharge of said cream, maintaining substantially constant said back pressure on the discharge of said continuous stream of cream from the zone of centrifugation to produce a cream of standardized butterfat content, and metering a regulated amount of said continuous stream of cream of standardized butterfat content while said last-mentioned stream is under said back pressure into said continuous stream of skim milk to produce a milk of standardized butterfat content.

3. Apparatus comprising a centrifuge having a rotor of the full bowl type for the separation of a continuous stream of a dispersion into two continuous streams which differ in concentration of the dispersed phase, said rotor being adapted to establish a differentially higher discharge pressure on one of said separated streams than on the other, means for maintaining a substantially constant back pressure on the stream discharged at higher pressure, and means for continuously metering a regulated amount of said last-mentioned stream while under said back pressure into the other of said streams.

4. Apparatus comprising a centrifuge having a rotor of the full bowl type for the separation of a continuous stream of a dispersion into continuous streams of two dispersions differing in dispersed phase concentration, said rotor being adapted to establish a differentially higher discharge pressure on the separated stream of lesser density, a relief valve for creating a substantially constant back pressure on the discharge of the separated stream of lesser density from said rotor, and a valve communicating with said last-mentioned stream between said centrifuge rotor and said relief valve for continuously metering a regulated amount of said last-mentioned stream into the other of said streams.

5. Apparatus comprising a centrifuge having a rotor of the full bowl type for the separation of a continuous stream of a dispersion into continuous streams of two dispersions of different dispersed phase content, said rotor being adapted to establish a differentially higher discharge pressure on the separated stream of lesser density, a conduit operatively connected to and leading from said centrifuge rotor for conducting away the separated stream of lesser density, a relief valve in said conduit to restrict flow therethrough with substantially constant back pressure, a second conduit operatively connected to and leading from said centrifuge rotor for conducting away the other of said separated streams, a third conduit connecting said first-mentioned and second-mentioned conduits, said third conduit being connected to said first-mentioned conduit between said rotor and said relief valve, and a valve in said third conduit for regulating flow therethrough.

6. A process for the centrifugal separation of a dispersion in which the dispersed phase is of a different density than the continuous phase into two dispersions each of standardized and different dispersed phase content, comprising subjecting said first-mentioned dispersion to centrifugation under applied feed pressure to cause the separation of said first-mentioned dispersion into a more concentrated dispersion and a less concentrated dispersion, said applied feed pressure being sufficient to maintain the zone of centrifugation full and said centrifugation being carried out under full bowl conditions and such that said more concentrated dispersion is discharged from the zone of centrifugation at a higher pressure than said less concentrated dispersion due to the application of back pressure on the discharge of said more concentrated dispersion, maintaining substantially constant said back pressure on the discharge of said more concentrated dispersion, and while said more concentrated dispersion is under said back pressure feeding a controlled amount thereof into said less concentrated dispersion.

7. A process for the centrifugal separation of butterfat containing milk into cream and milk each of standardized butterfat content, comprising subjecting said first-mentioned milk to centrifugation under applied feed pressure to cause the separation of said first-mentioned milk into cream and skim milk respectively, said applied feed pressure being sufficient to maintain the zone of centrifugation full and said centrifugation being carried out under full bowl conditions and such that said cream is discharged from the zone of centrifugation at a higher pressure than said skim milk due to the application of back pressure on the discharge of said cream, maintaining substantially constant said back pressure on the discharge of said cream, and while said cream is under said back pressure feeding a controlled amount thereof into said skim milk.

References Cited in the file of this patent

UNITED STATES PATENTS

| | | |
|---|---|---|
| 2,055,915 | Stigen | Sept. 29, 1936 |
| 2,145,544 | Hapgood | Jan. 31, 1939 |
| 2,264,665 | Hall | Dec. 7, 1941 |
| 2,344,888 | Lindgren | Mar. 21, 1944 |

FOREIGN PATENTS

| | | |
|---|---|---|
| 473,418 | Great Britain | Oct. 12, 1937 |
| 474,017 | Great Britain | Oct. 25, 1937 |
| 691,386 | Germany | May 24, 1940 |